(12) United States Patent
Ries-Müller et al.

(10) Patent No.: US 6,438,485 B1
(45) Date of Patent: Aug. 20, 2002

(54) METHOD FOR OPERATING AN INTERNAL COMBUSTION ENGINE, ESPECIALLY OF AN AUTOMOBILE

(75) Inventors: Klaus Ries-Müller, Bad Rappenau; Thomas Mocken, Bietigheim-Bissingen; Christian Tischer, Hemmingen, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/582,263

(22) PCT Filed: Dec. 17, 1998

(86) PCT No.: PCT/DE98/03710

§ 371 (c)(1),
(2), (4) Date: Aug. 2, 2000

(87) PCT Pub. No.: WO99/34104

PCT Pub. Date: Jul. 8, 1999

(30) Foreign Application Priority Data

Dec. 24, 1997 (DE) .......................................... 197 57 875

(51) Int. Cl.$^7$ ........................... F02D 41/04; G06F 9/46; G05B 15/00
(52) U.S. Cl. ........................ 701/102; 701/114; 123/480
(58) Field of Search ................................ 701/101, 102, 701/103, 104, 105, 110, 111, 114, 115; 123/480, 486

(56) References Cited

U.S. PATENT DOCUMENTS

| 4,482,962 A | * | 11/1984 | Amano et al. ............... 701/114 |
| 5,095,437 A | * | 3/1992 | Shibata et al. ............... 701/102 |
| 5,162,999 A | | 11/1992 | Schneider et al. .......... 701/114 |

FOREIGN PATENT DOCUMENTS

| EP | 0 360 528 | 3/1990 |
| EP | 0 608 456 | 8/1994 |
| GB | 1492139 | 11/1977 |
| GB | 2058406 | 4/1981 |
| JP | 07 063108 | 3/1995 |
| WO | WO 88 06236 | 8/1988 |

\* cited by examiner

Primary Examiner—Willis R. Wolfe
(74) Attorney, Agent, or Firm—Walter Ottesen

(57) ABSTRACT

An internal combustion engine, especially for a motor vehicle, is described which is provided with a control apparatus. A number of functions can be executed at time intervals and/or in dependence upon the rpm of the engine. Furthermore, a quantity (RA), which defines the utilization of the control apparatus, and a quantity (N), which defines the rpm of the engine, can be determined. The number of executed functions can be reduced by the control apparatus when the quantity (RA), which defines the utilization, is greater than a utilization threshold value (ASW1).

13 Claims, 3 Drawing Sheets

| Priority | Function |
|---|---|
| 1 | Base functions, such as injection, ignition |
| 2 | Engine protective functions, such as knock control |
| 3 | Exhaust-gas functions, such as lambda control |
| 4 | Comfort functions, such a load-reversal damping |
| 5 | Diagnostic functions |
| 6 | Adaptation functions, such as adaptation to vehicle deviations |

FIG. 1

METHOD FOR OPERATING AN INTERNAL COMBUSTION ENGINE, ESPECIALLY OF AN AUTOMOBILE

FIELD OF THE INVENTION

The invention relates to a method for operating an internal combustion engine, especially of a motor vehicle, by means of a control apparatus wherein a number of functions are carried out at time intervals and/or in dependence upon the rpm of the engine and wherein a quantity is determined which defines the utilization or work load of the control apparatus and wherein a quantity is determined defining the rpm of the engine. Furthermore, the invention relates to an internal combustion engine, especially for a motor vehicle, having a control apparatus by which a number of functions can be executed at time intervals and by which a quantity, which defines the utilization of the control apparatus, and a quantity, which defines the rpm of the engine, can be determined.

BACKGROUND OF THE INVENTION

For the open-loop control and/or closed-loop control of modern engines, especially of motor vehicles, it is necessary that a number of functions be executed by a control apparatus, especially by a microprocessor. Accordingly, it is required, on the one hand, that so-called basic functions, such as the mass of the fuel which is to be injected into the combustion chamber of the engine or the time point of the ignition of the injected fuel mass are determined in dependence upon the rpm of the engine. These functions are thereby in synchronism with the rpm. On the other hand, there are functions such as adaptation functions which must be executed by the control apparatus at pregiven time intervals. Such intervals can, for example, be a raster of 10 ms or the like. These functions are thereby time-synchronous.

With a high rpm of the engine, the rpm-synchronous functions must be executed significantly more frequently than at a low rpm. If, for a high rpm of this kind, a plurality of time-synchronous functions is added which must be computed by the control apparatus, then it is possible that the control apparatus is overloaded. This can lead to malfunctions of the control apparatus.

To avoid such malfunctions, it is provided that a quantity is generated which defines the utilization of the control apparatus. This quantity can be applied to prevent possible overloads of the control apparatus.

SUMMARY OF THE INVENTION

Proceeding from the above, it is an object of the invention to provide a method for operating an internal combustion engine, especially of a motor vehicle, which includes measures which counter an overloading of the control apparatus.

This object is solved in a method and/or in an internal combustion engine of the above-mentioned type in accordance with the invention in that the number of executed functions is reduced when the quantity, which defines the utilization, is greater than a utilization threshold value and/or that the time intervals of the execution of the functions is increased when the quantity, which defines the rpm, is greater than an rpm threshold value or when the quantity, which defines the utilization, is greater than the utilization threshold value.

An overloading of the control apparatus is countered by the reduction of the number of the executed functions and/or the increase of the time interval of the execution of the functions. If, for example, the quantity, which defines the utilization of the control apparatus, shows that the control apparatus is almost overloaded or is already overloaded, then, and according to the invention, the number of the executed functions is reduced with the consequence that the control apparatus must execute fewer functions and thereby is less loaded. The threatened overload of the control apparatus and/or the already occurring overload of the control apparatus is countered in this way. According to the invention, the time interval of the execution of the functions is increased when the quantity, which defines the rpm of the engine, and/or the quantity, which defines the utilization, indicate that especially the above-mentioned basic functions must be carried out very often because of a high rpm and that therefore an overload of the computing apparatus is possible. This has the consequence that the above-mentioned functions no longer have to be executed so frequently and that the control apparatus is thereby relieved. An overloading of the control apparatus is therefore also countered in this way.

In total, with the measures of the invention, it is prevented that the control apparatus is overloaded. The risk that faults occur because of overloading is thereby significantly reduced. The invention thereby contributes to the correct and reliable operation of the engine.

In an advantageous embodiment of the invention, the number of functions is subdivided into classes having different priorities and those functions having the lowest priority are not executed when the quantity, which defines the utilization, is greater than the utilization threshold value. In this way, it is achieved that first those functions are not executed which have only a lesser significance for the operation of the engine. In this way, it is guaranteed that the functions, which are essential for the operation of the engine, are at least not immediately switched off. The correct and reliable operation of the engine is thereby ensured even after a switchoff of functions.

In a further advantageous embodiment of the invention, an additional threshold value is provided which is less than or equal to the utilization threshold value and the functions having the second lowest priority are not executed when the quantity, which defines the utilization, is greater than the additional threshold value. In this way, it is achieved that (when the switchoff of the functions having the lowest priority is still not sufficient to prevent an overloading of the control apparatus) those functions are additionally switched off which are provided with the second lowest priority. This defines, in total, a stepwise switchoff of the functions. At each step, always the functions having the respective lowest priorities are no longer executed. In this way, it is ensured that the functions, which are essential for the operation of the engine, are only switched off very late. The correct and reliable operation of the engine is in this way substantially maintained even for a large overload of the control apparatus.

It is especially purposeful when the following functions are provided wherein the sequence of the functions corresponds to their priority: basic functions such as injection, ignition; engine protective functions such as knock control; exhaust-gas functions such as lambda control; comfort functions such as load impact damping; diagnostic functions such as detection of misfires; adaptation functions such as adaptation to vehicle scattering. Because of the high priority, of, for example, the exhaust-gas functions, it is ensured that the probability for the switchoff of these functions is very slight. It is understood that the breakdown into functions of this kind, and also the allocation of priorities to functions of this kind, can also be arranged in a different way.

In an advantageous configuration of the invention, at least some of the functions, for example, basic functions, are completely executed in each case. This means that the basic functions cannot be switched off. In this way, it is achieved that the engine remains operable in each case. For an advantageous further embodiment of the invention, at least some of the functions, such as the exhaust-gas function, are broken down into component functions and only one or several of the component functions are not executed. For example, it is possible that also for a utilization of the control apparatus at which the exhaust-gas functions must have actually been switched off, these exhaust-gas functions are not completely switched off; instead, at least basic component functions of the exhaust-gas functions continue to be executed. In this way, it is ensured that even for an overload of the control apparatus (for example, statutory exhaust-gas determinations which are realized via the exhaust-gas functions) are in each case maintained.

In another advantageous embodiment of the invention, the time interval of the execution of the functions with the rpm of the engine and/or the utilization of the control apparatus is linearly or stepwise increased when the quantity, which defines the rpm, is greater than the rpm threshold value and the quantity, which defines the overload, is greater than the utilization threshold value. In this way, it is achieved that the time interval of the execution of the functions becomes greater, for example, with increasing rpm. A linear relationship can be present between this time interval and the rpm or the increase of the time interval takes place in one or in several jumps. In each case, with the procedure described, an overload of the control apparatus is countered so that a correct and reliable operation of the control apparatus is achieved. The same applies to an increasing utilization of the control apparatus.

In a further advantageous embodiment of the invention, an additional threshold value is provided which is greater than the rpm threshold value and/or the utilization threshold value and the time interval of the execution of the functions is maintained constant when the quantity, which defines the rpm, and/or the quantity which defines the utilization, is greater than the additional threshold value. This means that after the additional value is exceeded, the time interval of the execution of the functions is not increased further, instead, it remains constant.

In an advantageous embodiment of the invention, the time interval of the execution is increased only for those functions which are not dependent upon the rpm of the engine, that is, not for basic functions, for example. In this way, it is ensured that, for example, the basic functions are executed in each case in the time raster required for them. For example, in the basic functions, the time interval of the execution is not changed even for a high utilization of the control apparatus. In this way, it is ensured that even for a high utilization of the control apparatus, the basic functions are correctly and reliably executed and thereby the operation of the engine is maintained in each case.

Of special significance is the realization of the method of the invention in the form of a control element which is provided for a control apparatus of an engine especially of a motor vehicle. A program is stored on the control element which is capable of being run on a computing apparatus such as a microprocessor and is suitable for executing the method of the invention. In this way, the invention is realized by a program stored on the control element so that this control element, which is provided with the program, defines the invention in the same way as the method for which execution the program is suitable. As a control element, especially an electric storage medium can be applied, for example, a read-only-memory.

Additional features, application possibilities, and advantages of the invention become evident from the description of the embodiments of the invention which follows and which are shown in the figures of the drawing. All described and illustrated features define the subject matter of the invention by themselves or in any desired combination independently of their summary in the patent claims or their dependency as well as independently of their formulation and/or illustration in the description and/or in the drawing.

BRIEF DESCRIPTION OF THE DRAWINGS

The invention will now be described with reference to the drawings wherein:

FIG. 1 shows a schematic listing of functions and corresponding priorities in combination with a first embodiment of a method of the invention for operating an internal combustion engine especially of a motor vehicle;

DESCRIPTION OF THE PREFERRED EMBODIMENT OF THE INVENTION

Figure 2:
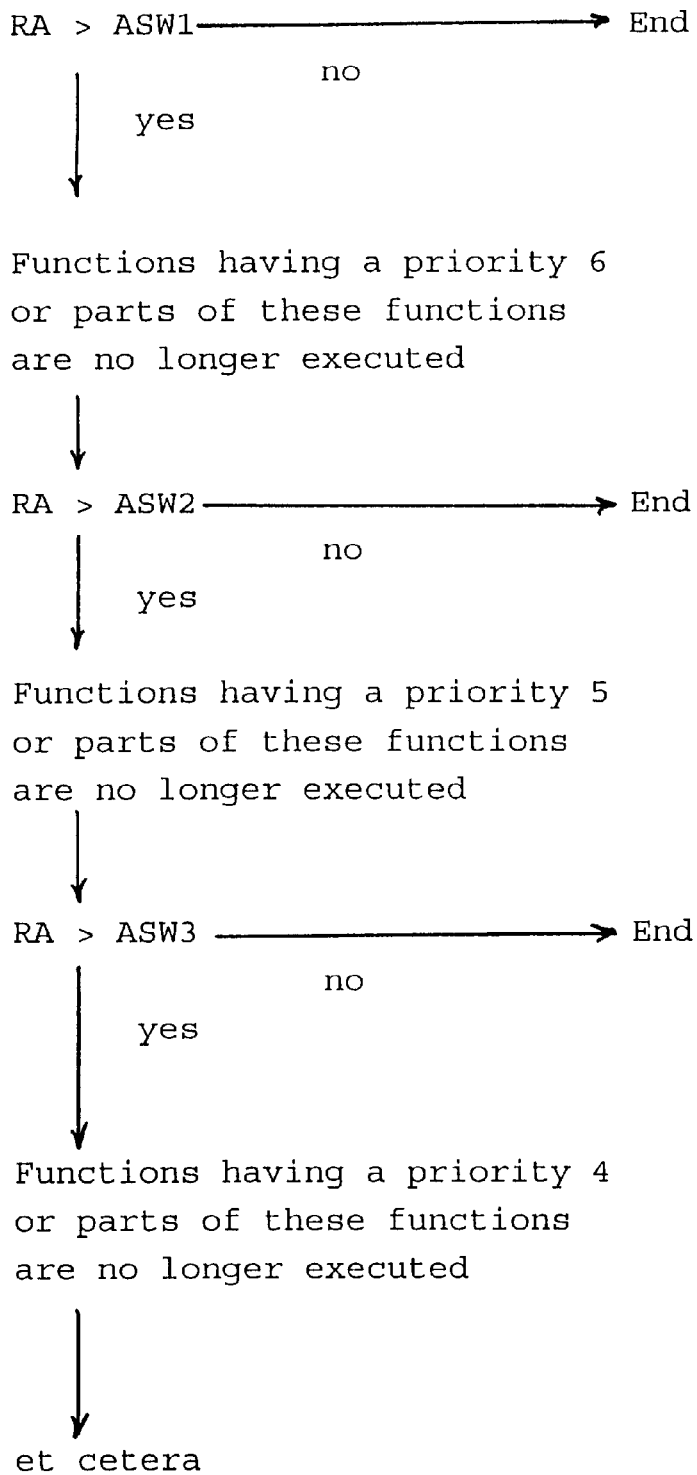
FIG. 2 shows a schematic sequence diagram of the method according to the first embodiment; and, FIG. 3 shows a schematic illustration of the connection between the rpm N and the time interval A of the execution of functions in combination with a second embodiment of a method of the invention for operating an internal combustion engine.

In, for example, a four-cylinder internal combustion engine, a combustion chamber is delimited in each cylinder by a piston which is movable back and forth. The combustion chamber is connected to the intake manifold and to an exhaust-gas pipe via valves. Furthermore, an injection valve and a spark plug are assigned to the combustion chamber with the aid of which fuel can be injected into the combustion chamber and be ignited. Furthermore, the engine has a control apparatus which is connected to a plurality of sensors such as with an air-mass sensor in the intake manifold and/or a lambda sensor in the exhaust-gas pipe and which is suitable to drive a plurality of actuators such as the injection valve and the spark plug.

A number of functions are executed by the control apparatus for the open-loop control and/or closed-loop control of the engine. These functions are, for example, the injection wherein a fuel mass, which is to be injected into the combustion chamber, is determined by the control apparatus in dependence upon the load applied to the engine or, the functions are concerned with a lambda control with which the air/fuel mixture, which is ignited in the combustion chamber, is adjusted with the aid of the spark plug in such a manner that as little as possible exhaust gases containing toxic substances arise or, the functions are other functions with which the control apparatus acts on the operation of the engine.

In FIG. 1, such functions are listed in a table. A priority is assigned to each of the individual functions. The priority 1 has the highest significance and the priority 6 has the lowest significance.

According to FIG. 1, the basic functions are assigned the highest priority 1. Especially the injection and the ignition are therefore given the highest priority. Functions which serve to protect the engine especially against destruction such as knock control have the priority 2. The next priority 3 is assigned to the exhaust-gas functions, for example, to the lambda control with which the generation of toxic substances of the engine is reduced to a minimum. So-called comfort functions such as an attenuation for a transition of an overrun operation into an acceleration is assigned the priority 4. The diagnostic functions have the second lowest priority 5. Malfunctions of the engine can be detected with the aid of the diagnostic functions. Finally, the adaptation functions are assigned the lowest priority 6. Adaptation functions of this kind are concerned, for example, with the detection and compensation of the consequences of manufacturing tolerances in the manufacture of different engines of the same type.

As already mentioned, all these functions are executed by the control apparatus of the engine. One distinguishes between so-called rpm synchronous functions and so-called time-synchronous functions.

The basic functions, for example, the injection and the ignition, are rpm synchronous functions. This means that computations, which are required for the injection or for the ignition are executed in dependence upon rpm. In the exemplary four-cylinder engine, the injection and the ignition for one of the cylinders must be computed every 180° of crankshaft angle. This has the consequence that, at higher rpms, the frequency of the computation of the basic functions per unit of time is greater than at a lower rpm. For the higher rpm, the control apparatus is more loaded by the computations of the basic functions than at a lower rpm.

The example for the time-synchronous functions are the adaptation functions. Time-synchronous functions of this kind are called up at a fixed time raster and executed. For such a time raster, a time interval of 10 ms or 50 ms or the like can be present. The frequency of the execution of the time-synchronous functions is therefore not greater with increasing rpm of the engine.

It is possible that the control apparatus, especially at high rpms of the engine, is greatly loaded or even overloaded because of the execution of rpm-synchronous functions and, if required, the additional time-synchronous functions which are to be executed. A quantity RA is determined, which defines the computer utilization of the control apparatus, so that the above does not lead to malfunctions of the control apparatus. One possibility of determining this computer utilization RA comprises the computation of the frequency or of the running time of the background programs or idle programs of the control apparatus. For example, if the running time of the background programs increases, this means that the computer utilization is lower. Conversely, the computer utilization is high when background programs or idle programs are run only infrequently.

The computer utilization is given exemplary in percent. 100% computer utilization RA means that the computer is running at full capacity and is overloaded with a further loading. A computer utilization RA of 100% should therefore be avoided. Furthermore, a certain safety margin of, for example, 5% should be maintained to this computer utilization RA of 100% so that the control apparatus, in each case, can still process suddenly occurring loading peaks without being overloaded.

In FIG. 2, a method is shown which counters an overloading of the control apparatus. In the method of FIG. 2, the computer utilization RA is compared by way of example to three utilization threshold values ASW1, ASW2 and ASW3. The utilization threshold value ASW1 lies, for example, at the already-mentioned 95%. With the utilization value ASW1 it is achieved that, for a computer utilization RA of 95%, the method of FIG. 2 is used. The utilization threshold value ASW2 lies, for example, at 93% and the utilization threshold value ASW3 lies, for example, at 91%. With the aid of the two utilization threshold values ASW2, ASW3, it is achieved that the overload of the control apparatus is not only countered for a short time, but that a hysteresis is generated as will be explained hereinafter.

According to FIG. 2, it is first checked as to whether the computer utilization RA is greater than the utilization threshold value ASW1 of 95%. If this is not the case, then the method of FIG. 2 is ended. However, if the computer utilization RA is greater than 95%, then those functions which have the lowest priority 6 in accordance with the table of FIG. 1 are no longer executed. This has the consequence that, because of the switched off functions of the priority 6 (that is, for example, because of the switched off adaptation functions), the load of the control apparatus is reduced. The extent of the reduction is dependent upon how many of such functions having the priority 6 are instantaneously present for execution.

For a large time raster of, for example, 50 ms of the functions having a priority 6, it is possible that the switchoff of these functions defines only a slight or no load reduction of the control apparatus. For this reason, a check is made in accordance with the method of FIG. 2 in a subsequent step as to whether a reduction of the load of the control apparatus has taken place.

For this purpose, a check is made as to whether the computer utilization RA is greater than the switchoff threshold value ASW2, that is, greater than 93%. If this is not the case (that is, the load of the control apparatus has dropped below 93%), then the method of FIG. 2 is ended. However, if the load of the control apparatus is greater than 93%, this means the switchoff of the functions having the priority 6 was not sufficient. For this reason, also those functions are no longer executed which have the priority 5 in accordance with the table of FIG. 1. Accordingly, for example, also the diagnostic functions are no longer executed.

The comparison of the computer utilization RA to the switchoff threshold value ASW2 of 93%, achieves that the control apparatus is relieved of load in each case by a certain amount. In this way, it is prevented that the load of the control apparatus again increases above 95% and that the method of FIG. 2 is immediately again started from the beginning. Insofar, the above-mentioned comparison to the switchoff threshold value ASW2 realizes a hysteresis.

This hysteresis can be further refined by the further comparison of the computer utilization RA to the switchoff threshold value ASW3 as shown in FIG. 2. If, with this check, it is determined that the computer utilization RA has become less than 91%, then the method of FIG. 2 is ended. However, if the computer utilization RA is greater than 91%, then also those functions additionally are switched off which have the priority 4 in the table of FIG. 1.

This method of FIG. 2 can be continued as desired.

Especially the basic functions having the priority 1 (that is, for example, the injection and the ignition) are, however, excluded from a switchoff in accordance with FIG. 2. This means that these basic functions, in each case, are completely executed. If required, still other functions having different priorities are present which cannot be switched off entirely or at least only partially.

Furthermore, it is possible that with the switchoff of functions not the entire function is switched off but only component functions thereof. If, for example, the diagnostic functions having the priority 5 are switched off in accordance with the method of FIG. 2, then it is possible that component functions contained therein (component functions, for example, which are required for the minimization of toxic substances) are not switched off and therefore continue to be executed.

If several functions have the same priority (for example, several adaptation functions are realized in the control apparatus), then it is further possible that alternately only one of the above-mentioned adaptation functions is no longer executed with the switchoff of these adaptation functions.

As already explained, the time-synchronous functions are executed at specific pregiven time intervals. These time intervals are at least not dependent upon the rpm of the engine in such a manner that, for increasing rpm, the time intervals become less and therefore the frequency of the execution of these functions increases as is the case for the rpm-synchronous functions.

Figure 3:
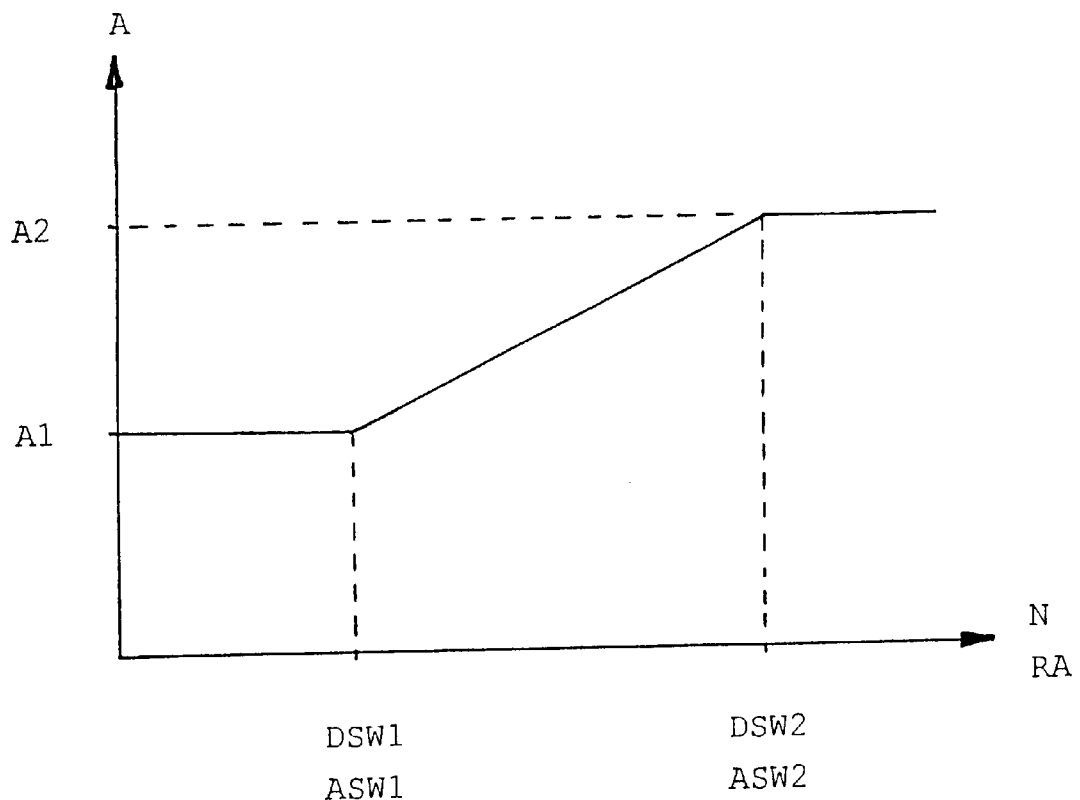

In FIG. 3, the rpm of the engine is shown by the quantity N over which the time interval of the execution of the functions is plotted as quantity A. Up to an rpm threshold value DSW1 (for example, up to 4,000 rpm), a time interval A1 of, for example, 10 ms is provided. Up to the rpm threshold value DSW1, the time-synchronous functions are therefore executed every 10 ms. If the rpm N is greater than the rpm threshold value DSW1, then, and in accordance with FIG. 3, the time interval A between the individual execution of the functions is linearly increased with the rpm. The greater the rpm becomes, the greater also the time interval of the execution of the functions becomes.

Starting at an rpm threshold value DSW2 (for example, starting at 6,000 rpm), the time interval is again held constant. For example, the time interval A2 is held at 10.5 ms.

In total, this means the time interval A1, which is provided below the rpm threshold value DSW1, is less than the time interval A2 which is provided above the rpm threshold value DSW2. The time interval of the execution of functions is therefore increased. The frequency of the execution of functions thereby becomes less. This has the consequence that the control apparatus is loaded less at higher rpms by the time-synchronous functions than at low rpms. In total, this defines a reduced loading of the control apparatus.

In lieu of the rpm N and the rpm threshold values DSW1, DSW2, the quantity RA, which defines the computer utilization, and the utilization threshold values ASW1, ASW2 or other utilization threshold values can be correspondingly used. This is also exemplarily shown in FIG. 3.

Departing from FIG. 3, it is likewise possible that the increase of the time interval A during the execution of functions is not carried out linearly with the rpm but is carried out stepwise. Thus, it is possible that, for a specific rpm threshold, the time interval is increased jumplike. Likewise, it is possible that the transition from a smaller to a larger time interval is carried out with the aid of several jumps at several rpm thresholds.

As already mentioned, the increase of the time interval of the execution of functions acts only on the time-synchronous functions. However, it is likewise possible in a corresponding manner to reduce the functions as to their frequency of computation starting at a pregivable rpm threshold value and/or a pregivable utilization threshold value. These functions are dependent upon the rpm of the engine. Thus, it is, for example, possible to execute specific functions only each second synchronous raster.

Likewise, it is possible to preclude specific time-synchronous functions (whose execution is perforce required in a specific time raster) from the described increase of the time interval and/or from the above-mentioned reduction of the frequency of computation. For example, these functions can be diagnostic functions which are essential for the minimization of the discharged toxic substances of the engine.

What is claimed is:

1. A method of operating an internal combustion engine, especially of a motor vehicle, by means of a control apparatus wherein a number of functions are executed at time intervals and/or in dependence upon the rpm of the engine and wherein a quantity (RA) which defines the utilization of the control apparatus, and a quantity (N), which defines the rpm of the engine, are determined, the method comprising the steps of:

increasing the time interval (A) of the execution of the functions when the quantity (N), which defines the rpm, is greater than an rpm threshold value (DSW1) or when the quantity (RA), which defines the utilization, is greater than the utilization threshold value (ASW1); and, also reducing the number of executed functions when the quantity (RA), which defines the utilization, is greater than a utilization threshold value ASW1.

2. A control element, especially a read-only-memory, for a control apparatus of an internal combustion engine, especially of a motor vehicle, on which a program is stored which can be run on a computing apparatus, especially on a microprocessor, and is suitable for carrying out a method having the step of: increasing the time interval (A) of the execution of the functions when the quantity (N), which defines the rpm, is greater than an rpm threshold value (DSW1) or when the quantity (RA), which defines the utilization, is greater than the utilization threshold value (ASW1).

3. An internal combustion engine, especially for a motor vehicle, comprising: a control apparatus by which a number of functions can be executed at time intervals and/or in dependence upon the rpm of the engine; and by which control apparatus, a quantity (RA), which defines the utilization of the control apparatus, and a quantity (N), which defines the rpm of the engine, can be determined, and the time interval (A) of the execution of the functions can be increased by the control apparatus when the quantity (N), which defines the rpm, is greater than an rpm threshold value (DSW1) or when the quantity (RA), which defines the utilization, is greater than the utilization threshold value (ASW1).

4. A method of operating an internal combustion engine, especially of a motor vehicle, by means of a control apparatus wherein a number of functions are executed at time intervals and/or in dependence upon the rpm of the engine and wherein a quantity (RA) which defines the utilization of the control apparatus, and a quantity (N), which defines the rpm of the engine, are determined, the method comprising the step of:

increasing the time interval (A) of the execution of the functions when the quantity (N), which defines the rpm, is greater than an rpm threshold value (DSW1).

5. A method of operating an internal combustion engine, especially of a motor vehicle, by means of a control apparatus wherein a number of functions are executed at time intervals and/or in dependence upon the rpm of the engine and wherein a quantity (RA) which defines the utilization of the control apparatus, and a quantity (N), which defines the rpm of the engine, are determined, the method comprising the steps of:

increasing the time interval (A) of the execution of the functions when the quantity (N), which defines the rpm, is greater than an rpm threshold value (DSW1) or when the quantity (RA), which defines the utilization, is greater than the utilization threshold value (ASW1); and, subdividing the number of functions into classes with different priorities (1 . . . 6) and the functions having the lowest priority (6) are not executed when the quantity (RA), which defines the utilization, is greater than the utilization threshold value (ASW1).

6. The method of claim 5, comprising the further step of providing a further threshold value (ASW2) which is less than or equal to the utilization threshold value (ASW1) and the functions having the second-lowest priority (5) are not executed when the quantity (RA) is greater than the additional threshold value (ASW2), the quantity (RA) defining the utilization.

7. A method of operating an internal combustion engine, especially of a motor vehicle, by means of a control apparatus wherein a number of functions are executed at time intervals and/or in dependence upon the rpm of the engine and wherein a quantity (RA) which defines the utilization of the control apparatus, and a quantity (N), which defines the rpm of the engine, are determined, the method comprising the step of:

increasing the time interval (A) of the execution of the functions when the quantity (N), which defines the rpm, is greater than an rpm threshold value (DSW1) or when the quantity (RA), which defines the utilization, is greater than the utilization threshold value (ASW1).

8. The method of claim 7, comprising the further step of providing the following functions wherein the sequence of the functions corresponds to their priorities (1 . . . 6): basic functions such as injection, ignition; engine protective functions such as knock control; exhaust-gas functions such as a lambda control; comfort functions such as load-reversal damping; diagnostic functions; and, adaptation functions such as adaptation to vehicle deviations.

9. The method of claim 7, wherein at least some of the functions, such as the basic functions, are completely executed in every case.

10. The method of claim 7, wherein at least some of the functions are broken down into component functions, such as exhaust-gas functions; and, only one or several of the component functions are not executed.

11. The method of claim 7, wherein: the time interval (A) of the execution of the functions is linearly or abruptly increased with the rpm of the engine and/or the utilization of the control apparatus when the quantity (N), which defines the rpm, and/or the quantity (RA), which defines the utilization, is greater than the rpm threshold value (DSW1) and the utilization threshold value (ASW1), respectively.

12. The method of claim 11, wherein a further threshold value (DSW2, ASW2) is provided which is greater than the rpm threshold value (DSW1) and the utilization threshold value (ASW1), respectively; and, the time interval (A) for executing the functions is held constant when the quantity (N), which defines the rpm, and the quantity (RA), which defines the utilization, is greater than the further threshold values (DSW2, ASW1), respectively.

13. The method of claim 11, wherein the time interval (A) of the execution is increased only for those functions which are not dependent upon the rpm of the engine, that is, for example, not for base functions.

\* \* \* \* \*